(12) United States Patent
Horst et al.

(10) Patent No.: US 7,648,436 B2
(45) Date of Patent: Jan. 19, 2010

(54) ROTARY ACTUATOR

(75) Inventors: Robert W. Horst, San Jose, CA (US);
Richard R. Marcus, Mountain View, CA (US)

(73) Assignee: Tibion Corporation, Moffett Field, CA (US)

( * ) Notice: Subject to any disclaimer, the term of this patent is extended or adjusted under 35 U.S.C. 154(b) by 367 days.

(21) Appl. No.: 11/649,403

(22) Filed: Jan. 3, 2007

(65) Prior Publication Data

US 2007/0155559 A1 Jul. 5, 2007

Related U.S. Application Data

(60) Provisional application No. 60/755,466, filed on Dec. 30, 2005.

(51) Int. Cl.
*F16H 7/12* (2006.01)
*F16H 7/14* (2006.01)

(52) U.S. Cl. .................. 474/134; 474/117; 474/133

(58) Field of Classification Search ......... 474/133–135; 901/21; 623/24, 30, 40, 50, 57; 74/337, 74/337.5, 490.01, 490.03, 490.04, 665 A, 74/567, 569, 421 A, 425
See application file for complete search history.

(56) References Cited

U.S. PATENT DOCUMENTS

| 1,739,053 | A | * | 12/1929 | Wilhelm | 474/109 |
|---|---|---|---|---|---|
| 3,402,942 | A | * | 9/1968 | Shimano et al. | 280/236 |
| 3,863,512 | A | * | 2/1975 | Crawley | 474/80 |
| 4,507,104 | A | * | 3/1985 | Clark et al. | 474/112 |
| 4,731,044 | A | * | 3/1988 | Mott | 474/8 |
| 4,981,116 | A | * | 1/1991 | Trinquard | 123/90.31 |
| 5,345,834 | A | * | 9/1994 | Hayashi | 74/421 A |
| 5,728,017 | A | * | 3/1998 | Bellio et al. | 474/70 |
| 6,494,798 | B1 | * | 12/2002 | Onogi | 474/28 |
| 2003/0104886 | A1 | * | 6/2003 | Gajewski | 474/87 |

* cited by examiner

Primary Examiner—Robert A Siconolfi
Assistant Examiner—Robert T Reese
(74) Attorney, Agent, or Firm—Perkins Coie LLP

(57) ABSTRACT

A technique for providing a variable-ratio coupling between output shaft and input motor involves driving an output shaft with drivers that are out of phase with each other. Advantageously, the technique provides a gear reduction via a simple, high-efficiency mechanism; continuous output torque is provided by alternating the load between two belts deflected by, by way of example but not limitation, cam devices.

11 Claims, 9 Drawing Sheets

ROTARY ACTUATOR

CROSS REFERENCE TO RELATED APPLICATIONS

This Application claims the benefit of U.S. Provisional Application No. 60/755,466 filed Dec. 30, 2005, entitled VARIABLE RATIO MOTOR, GENERATOR AND TRANSMISSION, the disclosure of which is incorporated herein by reference.

BACKGROUND

Motors and actuators are used in a wide variety of applications. Many applications, including robotics and active orthotics, require characteristics similar to human muscles. The characteristics include the ability to deliver high torque at a relatively low speed and to allow free-movement when power is removed, thereby allowing a limb to swing freely during portions of the movement cycle. This may call for an actuator that can supply large forces at slow speeds and smaller forces at higher speeds, or a variable ratio transmission (VRT) between the primary driver input and the output of an actuator.

In the past, several different techniques have been used to construct a VRT. Some examples of implementations of VRTs include Continuously Variable Transmissions (CVTs) and Infinitely Variable Transmissions (IVTs). The underlying principle of most previous CVTs is to change the ratio of one or more gears by changing the diameter of the gear, changing the place where a belt rides on a conical pulley, or by coupling forces between rotating disks with the radius of the intersection point varying based on the desired ratio. Prior art CVTs have drawbacks in efficiency, complexity, maximum torque, and range of possible ratios.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for providing a variable-ratio coupling between output shaft and input motor involves driving an output shaft with drivers that are out of phase with each other. Advantageously, the technique provides a gear reduction via a simple, high-efficiency mechanism; continuous output torque is provided by alternating the load between two belts deflected by, by way of example but not limitation, cam devices.

The technique provides high torque and allows the torque to be traded for speed at a given power level, and provides continuous output torque when operated as a motor or continuous braking forces when operated as a generator. A system according to the technique can be used as a transmission to couple rotary or oscillating forces from an input drive shaft to a continuous, variable-ratio output shaft. Sensors may provide a low power tracking mode to allow the output to move freely much as a relaxed muscle allows an arm or leg to swing freely.

The technique may be used to construct actuators for active orthotics, robotics or other applications. Versions with passive one-way clutches may also be used to construct variable-ratio motor gearheads, or may be scaled up to build continuously variable transmissions for automobiles, bicycles, or other vehicles.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1A:
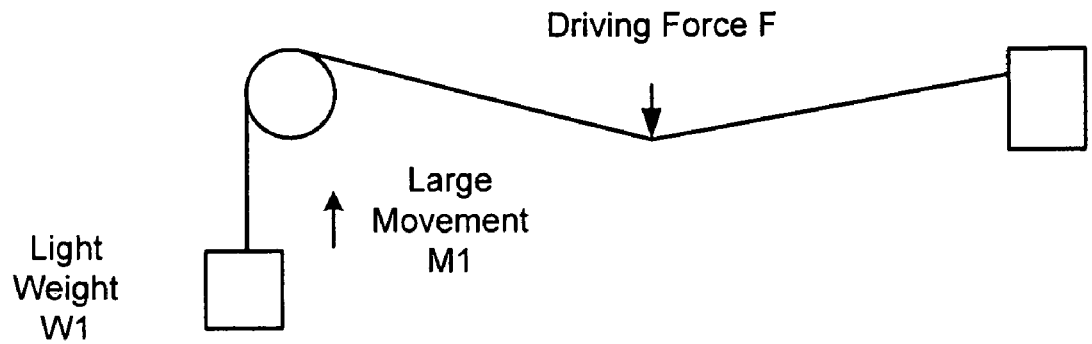
FIGS. 1A and 1B are diagrams illustrating a principle of operation.
Figure 1B:
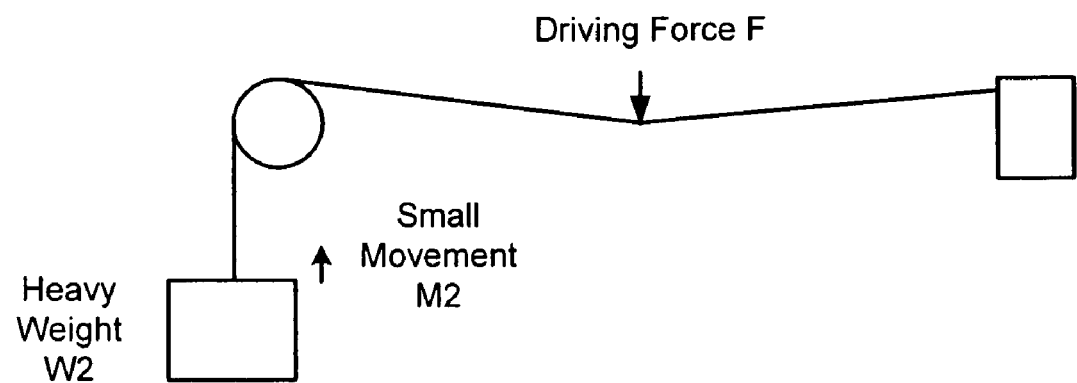

FIGS. 1A and 1B illustrate a principle of operation useful for an understanding of the teachings provided herein. FIGS. 1A and 1B show how a force can be used to deflect a belt and exert a strong force over a short distance or a weak force over a longer distance. FIG. 1A shows weight W1 attached to a rope that is anchored at one end and supported by a pulley. A force F deflects the rope near the middle and force F causes weight W1 to be lifted a distance M1. FIG. 1b shows that when the weight is replaced by a heavier weight W2, the same driving force F causes it to be lifted a smaller distance M2. Hence the rope has provided a variable transmission between the driving force F and the resisting force applied by the weight. By constructing a device that allows for multiple sequential deflections of a flexible belt, this principle can be used to construct a variety of actuators and transmissions.

U.S. patent application Ser. No. 11/033,368, which was filed on Jan. 13, 2005, and which is incorporated by reference, describes a high torque "pinch" motor with a variable ratio coupling between a driver and output. The motor includes a flexible disk or belt that couples a braking pulley and an output pulley. The output is alternately advanced or held in place while the driver returns to the position where it can again deflect the belt or disk to advance the output. However, the design does not allow for continuous output torque.

U.S. patent application Ser. No. 11/649,493 entitled "Linear Actuator" by Horst et al. filed concurrently herewith is incorporated by reference. U.S. patent application Ser. No. 11/649,496 entitled "Continuously Variable Transmission"

by Horst et al. filed concurrently herewith is incorporated by reference. U.S. patent application Ser. No. 11/649,690 entitled "Deflector Assembly" by Horst et al. filed concurrently herewith is incorporated by reference.

Figure 2A:
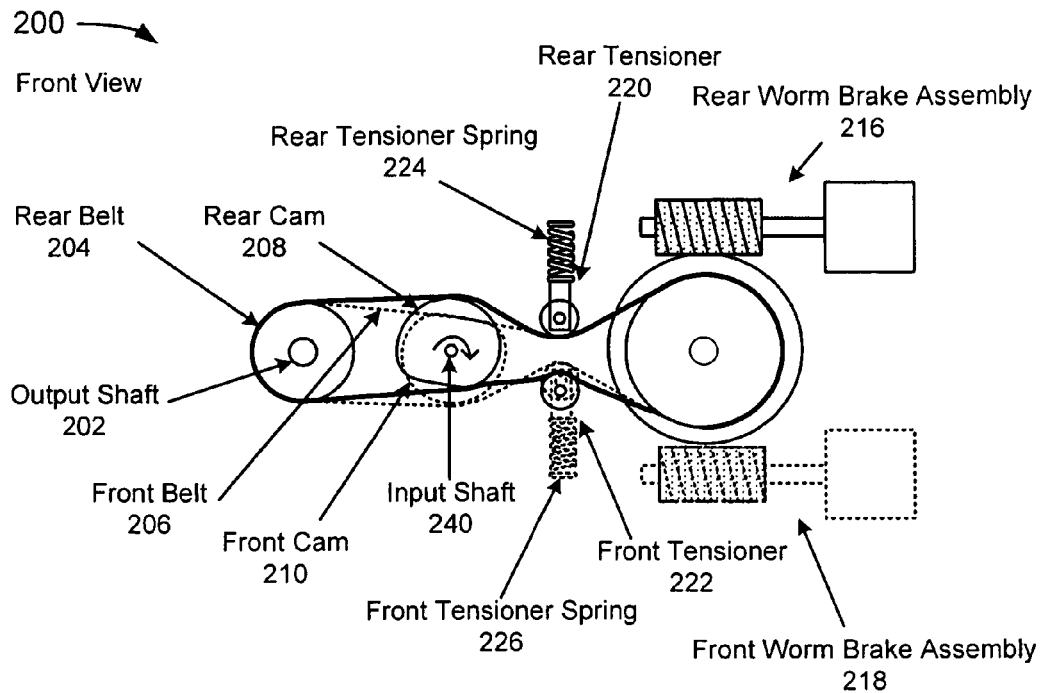
FIGS. 2A and 2B show an example of a variable ratio, worm-braked actuator with a rotating output shaft.
Figure 2B:
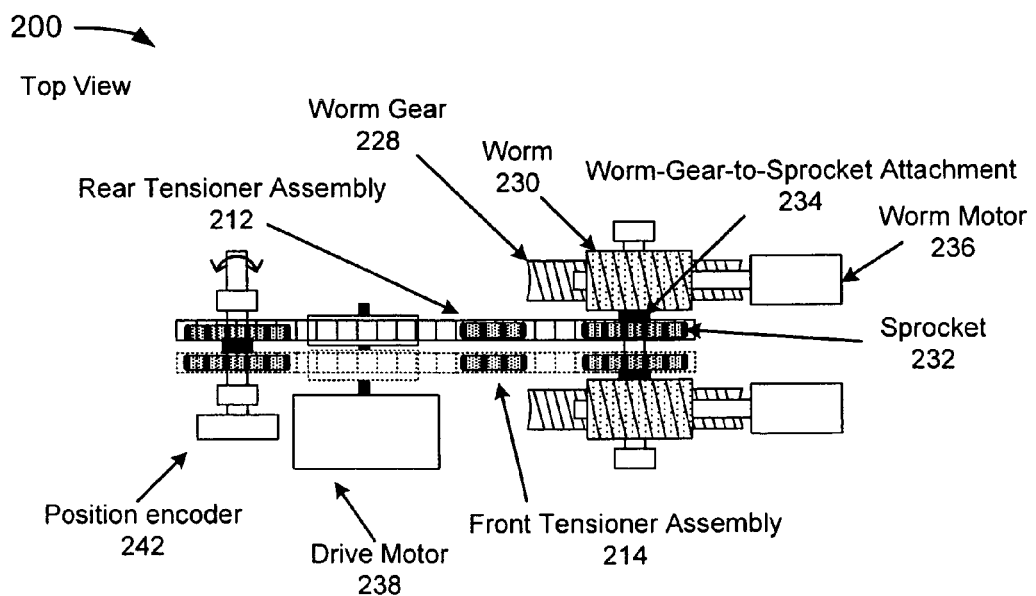

FIGS. 2A and 2B show an example of a variable ratio, worm-braked actuator 200 with a rotating output shaft. In an embodiment, the actuator 200 allows for continuous output torque. FIG. 2A depicts a front view of the actuator 200, and FIG. 2B depicts a top view of the actuator 200.

In the example of FIGS. 2A and 2B, the actuator 200 includes an output shaft 202, a rear belt 204, a front belt 206, a rear cam 208, a front cam 210, a rear tensioner assembly 212, a front tensioner assembly 214, a rear worm brake assembly 216, and a front worm brake assembly 218. The rear tensioner assembly 212 and the front tensioner assembly 214 each include a rear tensioner 220, a front tensioner 222, a rear tensioner spring 224, and a front tensioner spring 226. The rear worm brake assembly 216 and the front worm brake assembly 218 each include a worm gear 228, a worm 230, a sprocket 232, a worm-gear-to-sprocket attachment 234, and a worm motor 236. The actuator 200 may further include a driver motor 238, an input shaft 240, and a position encoder 242.

As is depicted in the example of FIGS. 2A and 2B, the actuator 200 has dual belts (the rear belt 204 and the front belt 206). Both belts drive the output shaft 202, but each belt has a separate brake formed by the sprocket 232 coupled to the worm gear 228 by the worm-gear-to-sprocket attachment 234, and driven by the worm 230. The worm motor 236 drives the worm 230, but, in an embodiment, the worm motor 236 is activated only when the associated belt (i.e., the rear belt 204 or the front belt 206) is slack. When the worm motor 236 is stopped, the worm 230 acts as a brake to prevent rotation of the worm gear 228 and its attached sprocket 232. The primary output force comes from rotating a cam (either the rear cam 208 or the front cam 210) to deflect the associated belt held stationary at one end by the worm 230 "brake" and coupled to the output shaft 202 at the other end.

In an embodiment, the actuator 200 is implemented with the driver motor 238 coupled to the input shaft 240 with the cams 208, 210 mounted out of phase. The cams 208, 210 may be positioned out of phase with each other to allow one to be moving the load while the other is moving back to the minimum displacement position while slack is removed from the associated belt 204, 206. The rear tensioners 220 take up the slack on the rear top and rear bottom belt segments, and the front tensioners 222 take up slack on the front top and front bottom belt segments. In a specific embodiment, the cams 208, 210 are positioned 180 degrees out of phase. It should be noted that "positioned 180 degrees out of phase" is intended to mean "approximately 180 degrees out of phase", since it is impossible to be perfectly precise (and in some implementations, precision is not critical).

In the example of FIGS. 2A and 2B, the cams 208, 210 are shaped to apply force for more than 180 degrees of rotation and to allow a smooth transition of force from one belt (e.g., the rear belt 204 or the front belt 206) to the other (e.g., the front belt 206 or the rear belt 204). The cams 208, 210 may be designed to provide continuous and nearly constant rotation of the output shaft 202.

The springs 224, 226 in the tensioners may act to reduce the belt displacement based on the belt tension, thereby providing a simple way to automatically adjust the drive ratio as the load increases. The tensioners 220, 222 may include belt tension sensors (not shown) to be fed back to the controlling electronics (not shown). Torque control of the drive motor 238 can be provided using belt tension sensors and the same sensors can be used to detect and follow movement of forces applied to the output shaft 202. Moreover, in an embodiment in which the belts 204, 206 are parallel to each other, the driving function can be delivered to both belts 204, 206 by the input shaft 240 coupled to the cams 208, 210, or may be implemented by two mechanisms that deflect the belts 204, 206 out of phase with each other.

The transmission ratio from driver to output is controlled by the amount the belt 204, 206 is deflected on each cycle. In an embodiment, the driver deflection can be set by the tensioner spring 224, 226, or in an alternative embodiment the drive ratio may be set by adjusting the belt deflection via a computer control system or a manual gear shifter (not shown). Small belt deflection provides high torque and low speed, while larger deflection provides lower torque and higher speed. When the actuator 200 is capable of operating as a generator, a regenerative braking mode is implemented by controlling the braking mechanism to allow a load to pull the belt tight, in turn supplying a force to move the driver.

In an embodiment, the belt is a chain and the pulley is a sprocket that engages the chain. In this embodiment, the tensioners 220, 222 may include sprockets that engage the belts 204, 206.

Each brake may be implemented with the worm brake assemblies 216, 218 along with thrust bearings that mount the worm brake assembly 216, 218 to the actuator 200 housing (not shown). The lead angle of the worm 230 should be shallow enough to assure that the worm 230 cannot be back-driven by the worm gear 228. Hence the actuator 200 provides braking when no power is applied to the worm motor 236.

In operation, the output shaft 202 is connected to two or more output pulleys with each output pulley engaging a belt that couples it to a braking pulley. The movement of each braking pulley is restricted by a brake or clutch. In actuator mode, a first brake is engaged while a second brake allows or forces a second braking pulley to advance in the direction of the output movement. The belts have enough slack to allow a driver to deflect the belt between the brake and load end of the belt. A variable ratio motor is implemented by engaging one braking pulley while releasing another braking pulley. The output is advanced by activating a first brake while a first driver deflects the top or bottom of the belt to advance the output in the desired direction. When the first driver is no longer deflecting the belt, the output motion continues due to the deflection of a second belt pulling against a second brake. The belt not pulling the output has the slack removed by allowing the belt to move through the released brake in preparation for the next cycle.

In an embodiment designed for forward and reverse operation, each belt may have tensioners at the top and the bottom of each belt. Each tensioner may have a weak spring that maintains belt tension on the loose side of the belt, and may also have a strong spring on the tight side of the belt. As the output torque increases, the strong spring deflects in a way that reduces the amount of deflection of the belt, thereby reducing the drive ratio. The belt tensioners may have magnets attached to change the magnetic field at linear hall-effect sensors mounted to the housing. The hall-effect sensors are read by controlling electronics and used to determine the belt tension at the top and bottom of each belt. The belt tension can be used to determine the torque being supplied to or from the output. The torque sensors are used to control the timing of operation of the worm motors and to sense movement of the motor output from external forces.

Figure 3A:
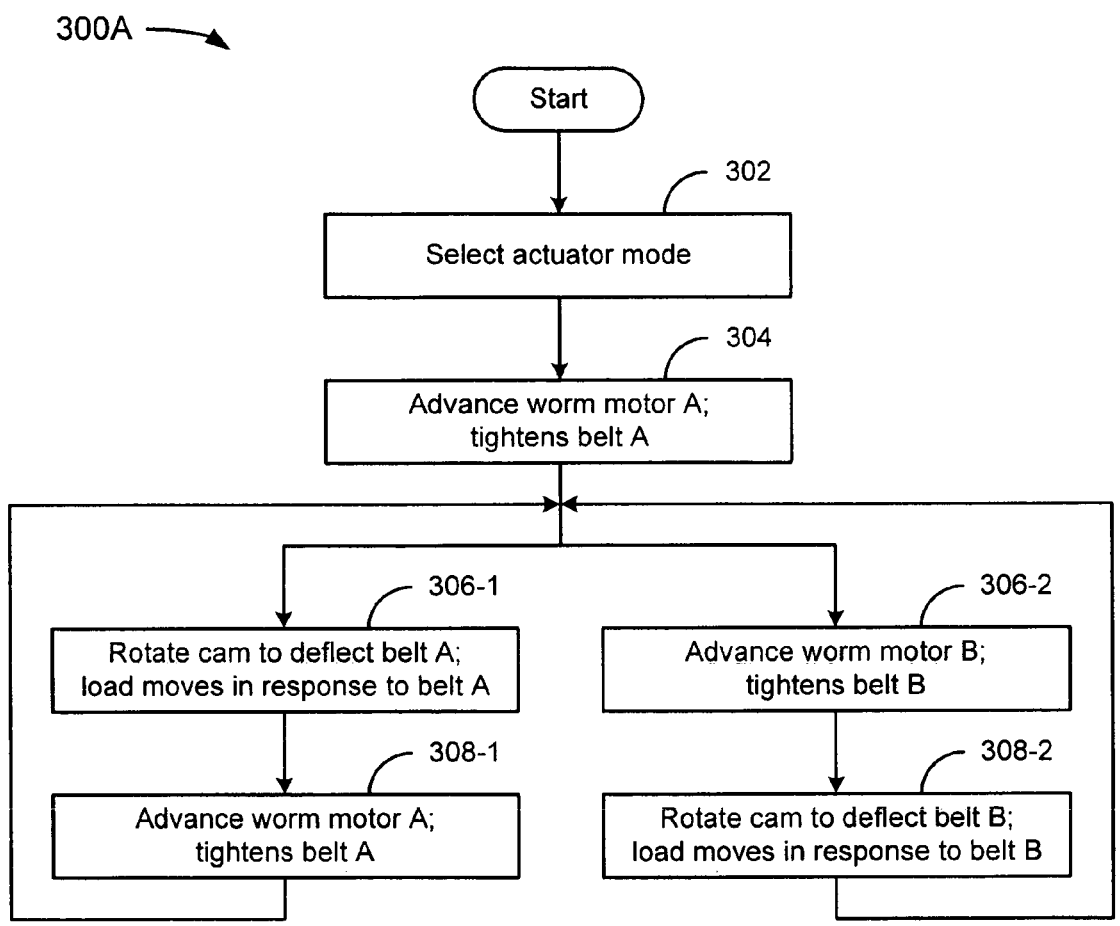
FIGS. 3A, 3B, and 3C are flowcharts of methods for actuator-mode operation of a worm-braked actuator.

FIG. 3A is a flowchart 300A showing operation of a worm-braked device in actuator mode. This method and other methods are depicted as modules arranged serially or in parallel.

However, modules of the methods may be reordered, or arranged for parallel or serial execution as appropriate. FIG. 3A is intended to illustrate an actuator mode of a continuous variable ratio motor.

In the example of FIG. 3A, the flowchart 300A starts at module 302 with selecting actuator mode. The flowchart 300A continues at module 304 with advancing worm motor A. Worm motor A may be either of dual (or more) worm motors that are part of a worm brake assembly of a continuous variable ratio motor. The result of advancing worm motor A is that belt A is tightened. Belt A may be either of dual (or more) belts that are part of a continuous variable ratio motor. It may be noted that the module 304 is optional in that if belt A is already tightened, the module 304 is not necessary to tighten belt A. The necessity of module 304, therefore, is dependent upon implementation and/or circumstances.

In the example of FIG. 3A, the flowchart 300A continues at modules 306-1 and 306-2, which are executed simultaneously. It may be noted that precise simultaneous execution may be impossible to achieve. Accordingly, "simultaneous" is intended to mean substantially simultaneous, or approximately simultaneous. Moreover, certain applications may require more or less accurate approximations of simultaneity. At module 306-1, a cam is rotated to deflect belt A. This has the result of moving a load in response to the deflection of belt A. At module 306-2, worm motor B is advanced to tighten belt B. Thus, the cam is rotated to deflect belt A while simultaneously tightening belt B.

In the example of FIG. 3A, the flowchart 300A continues at modules 308-1 and 308-2, which are executed simultaneously. At module 308-1, worm motor A is advanced to tighten belt A. At module 308-2, the cam is rotated to deflect belt B, and the load may be moved thereby. Thus, the cam is rotated to deflect belt B while simultaneously tightening belt A.

In the example of FIG. 3A, the flowchart 300A continues at the modules 306-1, 306-2, as described previously. In this way, continuous motion of the output is sustained. It should be noted that the flowchart 300A makes reference to a single cam, but that two cams could be used in alternative embodiments (e.g., a cam A and a cam B).

Figure 3B:
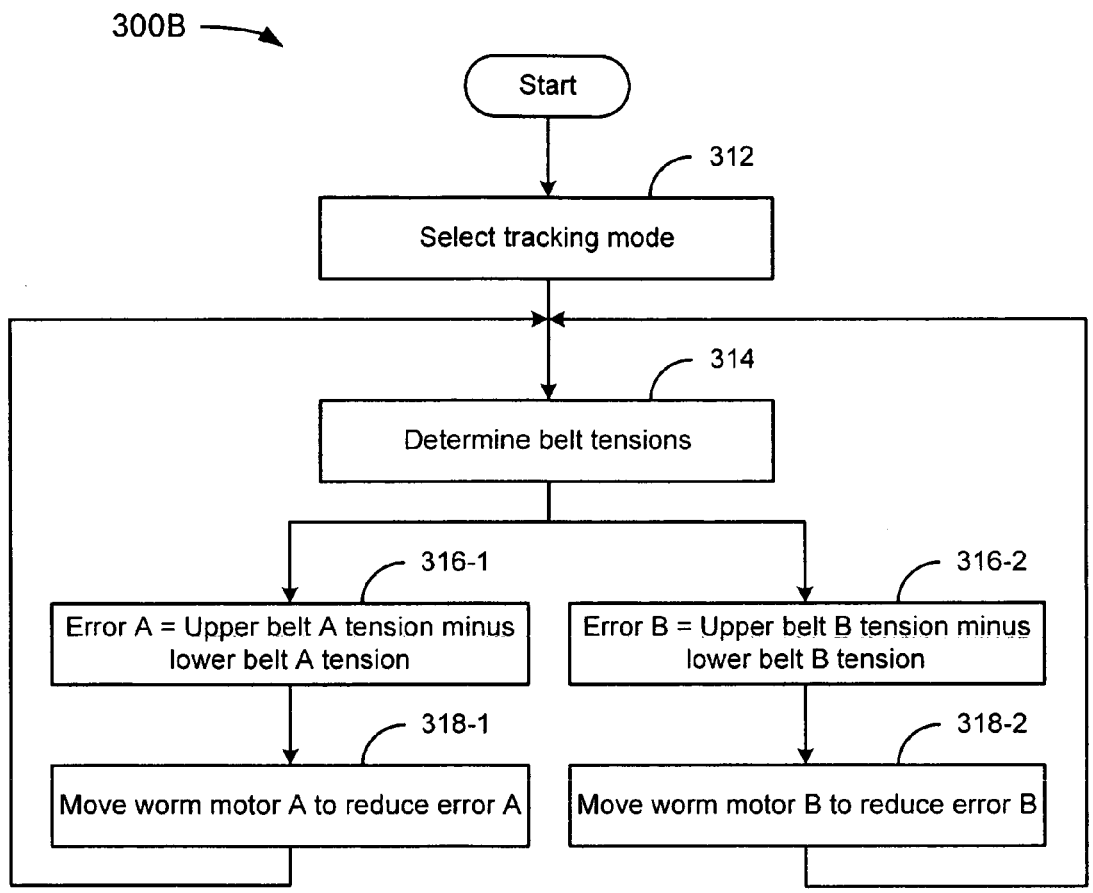

FIG. 3B is a flowchart 300B showing operation of a worm-braked device in tracking mode. FIG. 3B is intended to illustrate a tracking mode of a continuous variable ratio motor. In the example of FIG. 3B, the flowchart 300B starts at module 312 with selecting tracking mode.

In the example of FIG. 3B, the flowchart 300B continues at module 314 with determining belt tensions. In an embodiment, tension sensors are read to determine the tension on the top and bottom of both belts. The flowchart 300B continues at modules 316-1 and 316-2, which may be executed simultaneously. At the module 316-1, it is determined that error A is equal to upper belt A tension minus lower belt A tension. At the module 316-2, it is determined that error B is equal to upper belt B tension minus lower belt B tension. It should be noted that the module 314 involves determining belt tensions, so modules 316-1 and 316-2 may be thought of as the results of that determination.

In the example of FIG. 3B, the flowchart 300B continues at modules 318-1 and 318-2, which may be executed simultaneously. At the module 318-1, the worm motor A is moved to reduce error A. At the module 318-2, the worm motor B is moved to reduce error B. In an embodiment, when a belt is tighter on the top than on the bottom, its worm motor is activated to rotate the worm gear until the top and bottom of the belt again have the same tension. When the belt is tighter on the bottom, the worm is activated the opposite direction to rotate the worm gear. When an external force moves the output, the belts tensions change and the control system reacts to again equalize the tension on the bottom and top of the belts.

The flowchart 300B continues at module 314 as described previously. In this way, the tracking mode can continue until the tracking mode is exited. It should be noted that it may be impossible to entirely eliminate error A and error B, and different applications may demand different degrees of success in removing error.

Figure 3C:
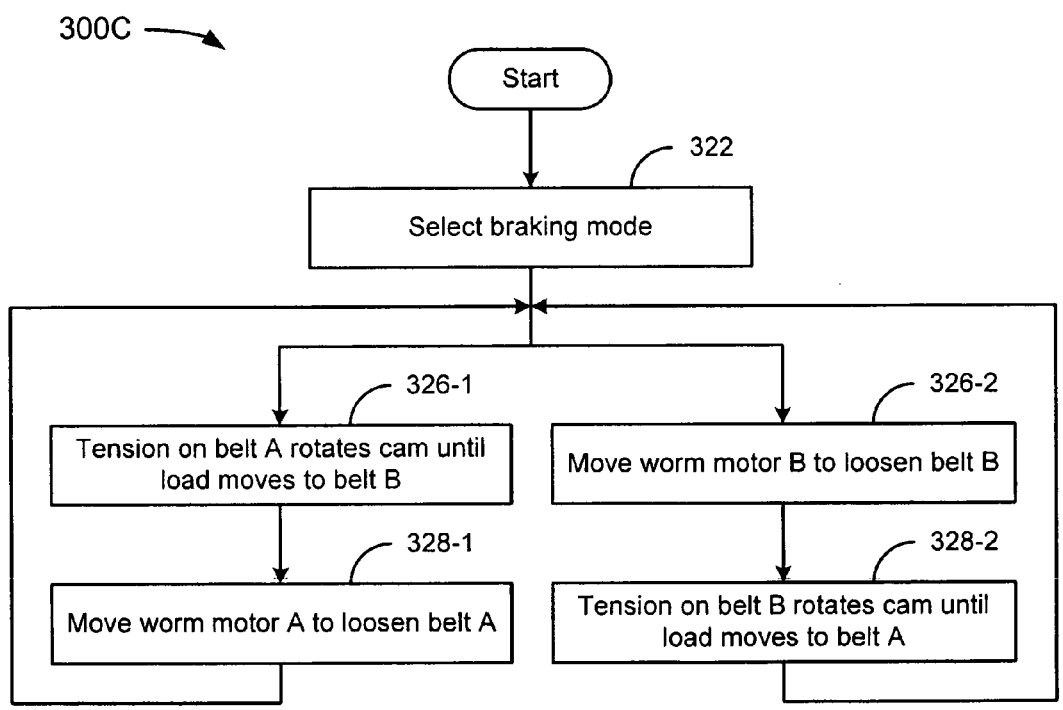

FIG. 3C is a flowchart 300C showing operation of a worm-braked device in braking mode. FIG. 3C is intended to illustrate a braking mode of a continuous variable ratio motor. It may be noted that in braking mode, the cam moves in the opposite direction to its motion in actuator mode. In the example of FIG. 3C, the flowchart 300C starts at module 322 with selecting braking mode.

In the example of FIG. 3C, the flowchart 300C continues at modules 326-1 and 326-2, which may be executed simultaneously. At the module 326-1, tension on belt A rotates a cam until a load moves to belt B. At the module 326-2, worm motor B is moved to loosen belt B. When an external force is applied, one of the belts becomes tight at the top or bottom, and that tension pulls against the cam to cause it to rotate. While that belt is supporting the load, the other worm motor loosens the other belt. The amount of loosening is chosen such that the load is passed from the first to the second belt before the first cam is rotated to its minimum displacement position.

In an embodiment, when the cam is being moved by the belt, energy can be recaptured by using the driver motor as a generator. Hence this mode can be used for regenerative braking or as a generator. In another embodiment, where the braking force is insufficient to rotate the cam, the cam motor can be controlled to force the appropriate rotation of the cam.

In the example of FIG. 3C, the flowchart 300C continues at modules 328-1 and 328-2, which may be executed simultaneously. At the module 328-1, worm motor A is moved to loosen belt A. At the module 328-2, tension on belt B rotates the cam until the load moves to belt A. The flowchart 300C then returns to the modules 326-1 and 326-2 to repeat the modules while in braking mode.

Figure 4:
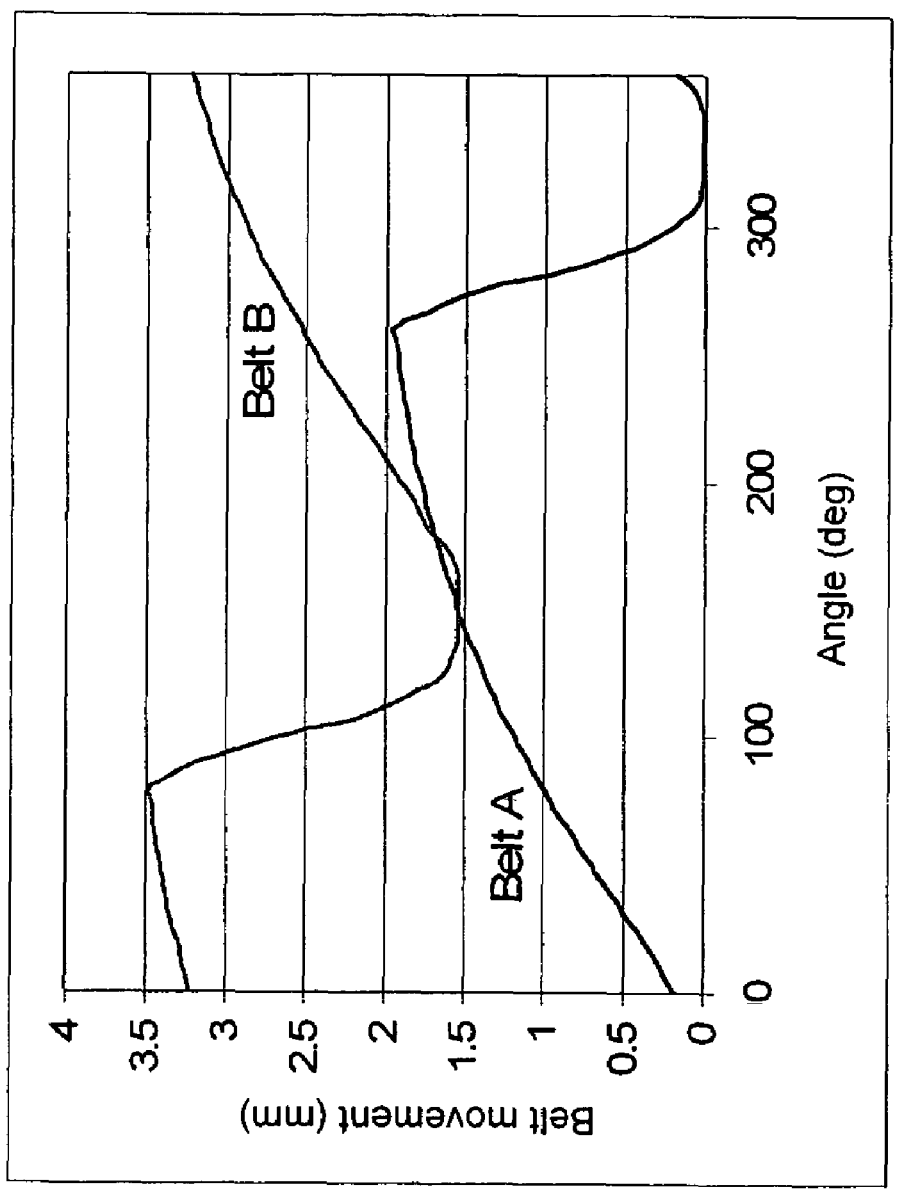
FIG. 4 is a graph illustrating continuous torque as tension is passed from one belt to another belt.

FIG. 4 shows a plot of the rotation angle of the two cams versus the change in belt length caused by the deflection of the belt. The output shaft movement in rotations is this belt deflection amount divided by the circumference of the output sprocket. FIG. 4 is plotted for a cam shape similar to that shown in FIG. 2 in which the radius increases quickly near its minimum radius, increases slowly as it approaches its maximum radius, then quickly decreases back to the minimum radius. This shape has an increasing radius for about 270 degrees and a decreasing radius for the other 90 degrees. By having the increasing radius more than 180 degrees, it is possible to have part of each cam rotation with the load shared between the two belts, allowing smooth operation with very little torque ripple.

The shape of the cam also allows for different drive ratios simply by adjusting the angle at which the cam touches and begins to deflect the belt. If the tensioner positions the belt to be tangent to the minimum radius of the cam, then the belt is deflected by the first 180 degrees of cam rotation. If the tensioner moves the belt support such that it contacts the cam only when it reaches 90 degrees of rotation, then the cam deflects the belt between 90 and 270 degrees. With this cam design, the radius delta of the cam between 0 and 180 degrees is greater than between 90 and 270 degrees, hence the belt is deflected less and movement of the tension has the effect of reducing the output speed, effectively dropping into a lower gear.

FIG. 4 also shows that this cam design has a large region where each degree of cam rotation results in a nearly linear change in belt displacement. This shows that the output torque will be nearly constant and independent of cam position. The graph for belt B has been displaced by the amount that belt A would have moved the output load. Note that where the two graphs intersect, the slope of the belt A line is less than that of belt B, hence belt B is accelerating to catch up and take over the load from belt A.

In braking mode, the cam moves the opposite direction, so it is like viewing FIG. 4 from right to left. The load starts out on belt B, but where the lines intersect, belt A has a radius changing more slowly than belt B, so its support of the load drops off faster and the load is transferred to belt A.

Figure 5A:
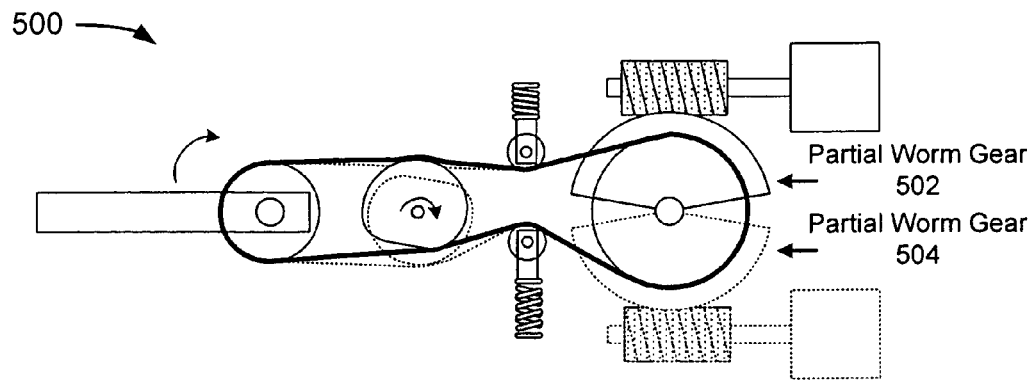
FIGS. 5A, 5B, and 5C show an example of a variable ratio, worm-braked actuator with reduced width and an output lever limited to less than 180 degrees of rotation.
Figure 5B:
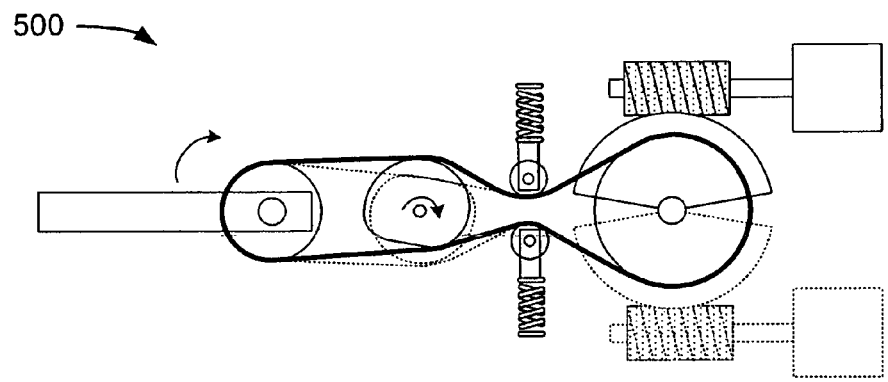
Figure 5C:
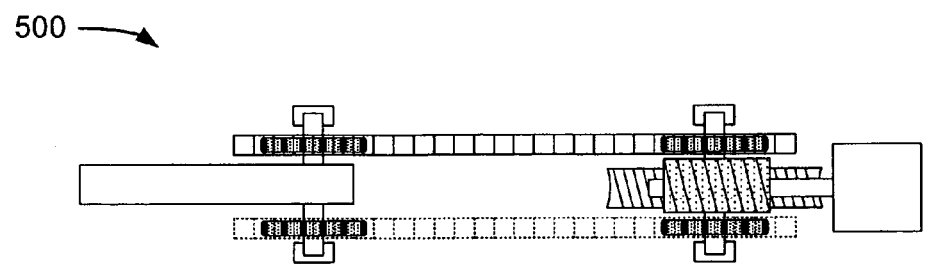

FIGS. 5A, 5B, and 5C show an example of a variable ratio, worm-braked actuator with reduced width and an output lever limited to less than 180 degrees of rotation. By "reduced width", this example shows an actuator 500 that has a slimmer profile than, for example, the actuator 200 (FIG. 2). The slim profile is especially beneficial for active orthotic applications where it is desirable to have an actuator close to a joint and concealable under normal clothing.

The actuator 500 includes many elements that are similar to those described with reference to FIG. 2, and which are not described again here. Unlike the actuator 200 (FIG. 2), however, the actuator 500 includes two or more partial worm gears 502, 504. In an embodiment, the partial worm gears 502, 504 are less than 180 degrees each.

As shown in the example of FIGS. 5A and 5B, the partial worm gear 502 is attached to front sprocket and the partial worm gear 504 is attached to the rear sprocket. In an embodiment, the gears occupy the same plane and reduce the thickness of the entire actuator. This reduced thickness is illustrated by FIG. 5C. The output sprockets are both attached to an output lever which is restricted in its movement by the maximum travel of the belt, which is restricted by the maximum travel of each partial worm gear.

FIGS. 5A and 5B also show two positions of the tensioners. FIG. 5A shows a low gear position with the springs compressed to restrict the maximum deflection of the belt. Low gear may be characterized as slow, high torque, with a large gear reduction ratio. FIG. 5B shows the high gear position with the springs relaxed to allow the maximum displacement of the belt. The high gear position may be characterized as fast, low torque, with a small gear reduction ratio. FIG. 5C shows the top view of the actuator 500 with a reduced profile compared to the actuator 200 of FIG. 2.

Figure 6:
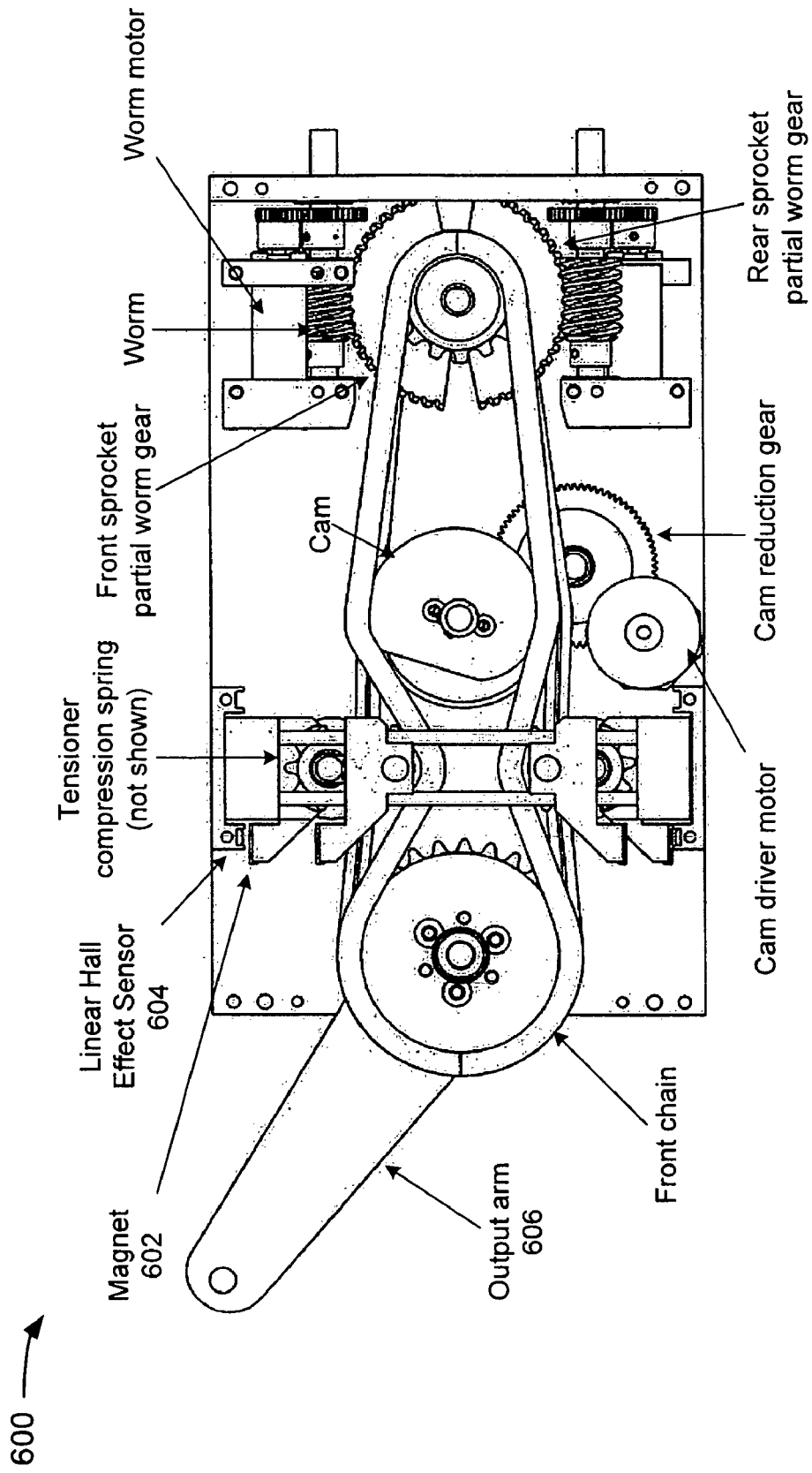
FIG. 6 shows additional details of a worm-braked actuator including tensioners and tension sensors.

FIG. 6 is a more detailed drawing of the split worm gear actuator of FIG. 5. This diagram shows the four tensioners, each with a magnet 602 that moves relative to a linear hall-effect sensor 604. As the belt tension increases, the tensioner sprocket moves towards the outside and causes the magnet 602 to come closer to the sensor 604. In an embodiment, a control system (not shown) can read a representation of the magnetic field strength from the sensor 604 to determine the tension on that portion of the belt. The belt tension is used to support tracking mode to allow an external force to move the output arm 606 with relatively little resistance. The belt tension is also used to determine the current torque of the actuator 600 and may be used by a control system to apply a desired torque.

Figure 7:
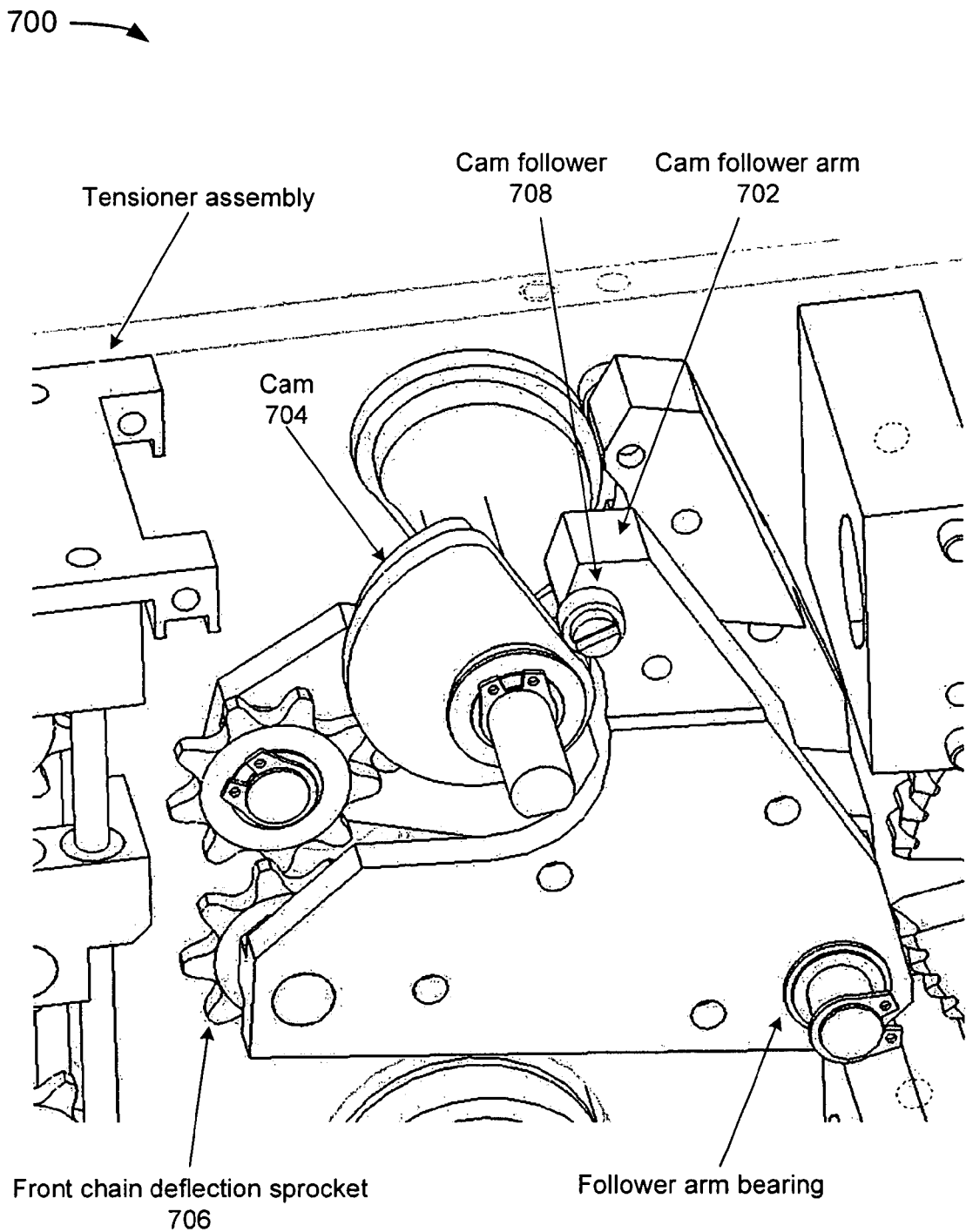
FIG. 7 shows an example of a driving mechanism using cam followers to deflect the belts.

FIG. 7 shows an example of a driving mechanism 700 using cam followers to deflect the belts. In cases where a cam directly deflects the belt, there can be undesirable friction between the belt and the cam, thus causing a drop in efficiency. The mechanism of FIG. 7 avoids this problem by using a follower arm 702 with a roller that engages the cam 704 and a sprocket 706 that engages the belt. In this way, all moving elements rotate on shafts with bushings or bearings to provide very low friction during movement. The follower 708 rotates around the follower arm shaft and engages the cam 704. The displacement of the chain can be designed to be more or less than the displacement of the cam 704 by adjusting the relative distances from the rotation point to the follower 708 and the sprocket 706.

An alternative way to reduce the friction between the cam and a chain is to use a chain that itself has low-friction rollers. This can be done by constructing a special chain with bearings at each chain link or by using a standard type of chain with rollers at each link.

The invention is not limited to the specific embodiments described. The number of belts, brakes and drivers are not restricted to the number shown and may be increased. The belts can be implemented by chains, timing belts, steel belts, V-belts, cables, or any other type of flexible material. The materials used in construction are not limited to the ones described. In an embodiment, the ratio adjusting mechanism allows for an external control to set the desired ratio via mechanical, electrical, hydraulic or other means for adjusting the pivot point of a cam follower mechanism or other applicable device.

As used herein, the term "cam device" means a cam or a cam with a follower. Accordingly, if a cam device is coterminous with, for example, an actuator belt, that means the cam may or may not be coterminous, but a cam follower (or leader) or some other component of the cam device is coterminous with the, for example, actuator belt.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. An orthotics system comprising: The application has been amended as follows:
   a drive motor;
   a first cam device, including a first cam, coupled to the drive motor;
   a second cam device, including a second cam mounted out-of-phase with respect to the first cam, coupled to the drive motor;
   a first belt conterminous with the first cam device, wherein, in operation, the first cam device deflects the first belt to a degree that is dependent upon a position and shape of the first cam;
   a second belt conterminous with the second cam device, wherein, in operation, the second cam device deflects the second belt to a degree that is dependent upon a position and shape of the second cam;
   a first brake assembly engaging a first worm-gear-to-sprocket attachment, the first worm-gear-to-sprocket attachment engaging a first sprocket, the first sprocket engaging the first belt wherein, in operation, the first brake assembly brakes the first belt by braking the first worm-gear-to-sprocket attachment;
   a second brake assembly engaging a second worm-gear-to-sprocket attachment, the second worm-gear-tosprocket attachment engaging a second sprocket, the second sprocket engaging the second belt, wherein, in operation, the second brake assembly brakes the second belt by braking the second worm-gear-to-sprocket attachment;

an output assembly conterminous with the first belt and the second belt, wherein, in operation, the output assembly is coupled to a load, the load is moved by the first belt when the first belt moves in a first direction, and the load is moved by the second belt when the second belt moves in the first direction, wherein deflection of the first belt and deflection of the second belt are phased to provide substantially continuous output torque.

2. The system of claim 1, further comprising an input shaft coupled between the drive motor and the first cam device, and between the drive motor and the second cam device, wherein the drive motor drives the first cam device and the second cam device by turning the input shaft.

3. The system of claim 1, wherein the first cam and the second cam are mounted 180 degrees out of phase with respect to one another.

4. The system of claim 1, wherein the first belt is a chain.

5. The system of claim 1, further comprising a tensioner assembly conterminous with the first belt, wherein, in operation, the tensioner assembly takes some slack out of the first belt.

6. The system of claim 1, further comprising a tensioner assembly, including:
   a tensioner conterminous with the first belt;
   a tensioner spring coupled to the tensioner;
   wherein, in operation, the tensioner engages the first belt to take out slack in the first belt and the tensioner spring provides a variable amount of deflecting force through the tensioner to the first belt.

7. The system of claim 1, further comprising:
   a first tensioner assembly conterminous with the first belt, wherein, in operation, the first tensioner assembly takes some slack out of the first belt;
   a second tensioner assembly conterminous with the second belt, wherein, in operation, the second tensioner assembly takes some slack out of the second belt.

8. The system of claim 1, further comprising:
   a tensioner assembly conterminous with the first belt;
   a tension sensor that detects tension at the tensioner assembly and uses the detected tension to provide torque control to the drive motor.

9. The system of claim 1, wherein the first brake assembly is a worm brake assembly.

10. The system of claim 1, wherein the first brake assembly includes:
   a worm gear engaged at the sprocket;
   a worm engaged at the worm gear;
   a worm motor, coupled to the worm, and capable of driving the worm;
   wherein, in operation, the worm motor drives the worm gear by driving the worm engaged at the worm gear, and wherein when the worm gear is not driven, the worm gear acts as a brake by preventing the sprocket that engages the first belt from turning.

11. The system of claim 1, wherein the output assembly includes a position encoder.

* * * * *